Jan. 15, 1935.   C. H. DESAUTELS   1,987,926
PNEUMATIC TIRE BUILDING DRUM

Filed Nov. 24, 1931

INVENTOR.

BY CHARLES H. DESAUTELS

Chapin & Neal
ATTORNEYS.

Patented Jan. 15, 1935

1,987,926

UNITED STATES PATENT OFFICE 1,987,926

PNEUMATIC TIRE BUILDING DRUM

Charles H. Desautels, Springfield, Mass., assignor, by mesne assignments, to The Fisk Rubber Corporation, a corporation of Delaware Application November 24, 1931, Serial No. 576,993

8 Claims. (Cl. 154—9)

This invention relates to the manufacture of pneumatic tire casings of the type generally termed air wheels, and more particularly to a drum upon which such tires may be built. Tires of this type are characterized by their small bead diameter as compared with their tread diameter, 46x20x10, 26x10x6 and 12x5x3 being typical sizes. Present types of collapsible chucks are wholly inadequate to accommodate tires of such small bead diameters, with the result that such tires are generally built on flat pulleys, despite the fact that the degree of distortion which the plies of such a tire must undergo in expanding it from band shape to completed tire form is undesirable. It is the object of my invention to provide a semi-flat drum, and a support or chuck therefor which will permit of building air wheels in semi-flat form. Other and further objects will be apparent from the following specification and claims.

In the accompanying drawing which illustrates one embodiment of my invention,

Figure 1:
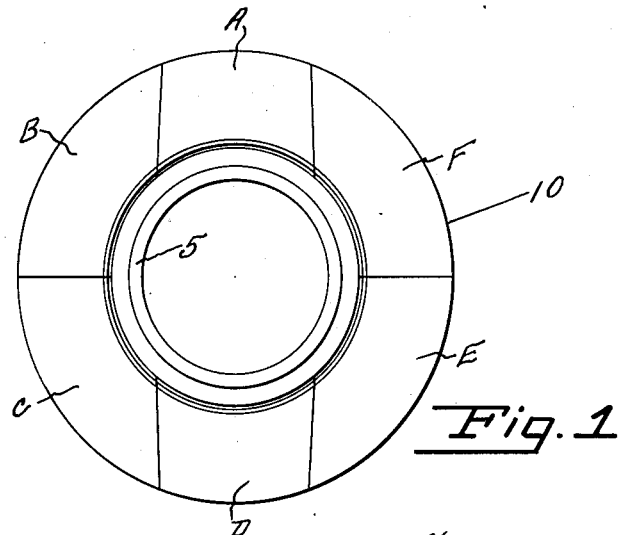
Fig. 1 is an end view of the drum and chuck.

Referring to the drawing, 1 designates generally the drum support or chuck which comprises a cylindrical member 2 adapted to be secured as at 3 by a set screw to the end of the power shaft of the building machine. Member 2 is reduced as at 4 to engage in the end of a cylindrical supporting member 5. A cylindrical collar 6 engages over the end of member 5 and the adjacent unreduced portion of cylinder 2. Parts 2, 5 and 6 make a driving fit and are further held rigidly together by pins 7.

Figure 2:
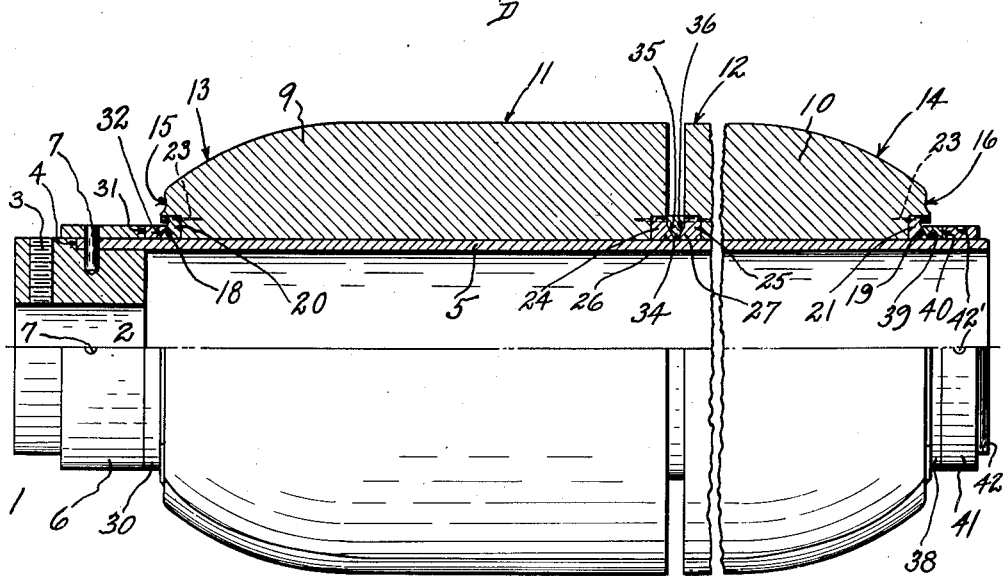
Fig. 2 is a side elevation of the drum and chuck, partly in section.

The drum proper comprises two separated annular members 9 and 10, each transversely cut into six sections as indicated at A, B, C, D, E and F in Fig. 1. The outer peripheries of members 9 and 10 are shaped to form, when in assembled relation as shown in Fig. 2, a substantially cylindrical crown building surface 11—12, the outer edges of said members being formed with curved sidewall portions 13 and 14 and bead receiving portions 15 and 16. The members 9 and 10 are preferably constructed of light material such as wood or aluminum, and are provided on their outer edges with locking recesses 18 and 19. As shown, these locking recesses are formed in metal inserts 20 and 21 secured to the respective drum members 9 and 10 by screws 23. The inner edges of the members 9 and 10 are respectively provided with metal inserts 24 and 25, respectively, formed with outwardly extending lips 26 and 27. A ring 30 is slidably fitted on the supporting member 5 of the chuck. Ring 30 is provided with a plane edge 31 adapted, as shown in Fig. 2, to abut against the shoulder formed by collar 6, the opposite edge being undercut to form a lip 32 engaging within the recesses 18 of the sections of member 9 to hold the sections in annular form on the supporting member 5. A second ring 34, slidable on support 5, is provided with undercut edges 35 and 36 adapted to respectively engage over the lips 26 and 27 of the drum sections. A third ring 38, similar to ring 30, is formed with a lip 39 engaging in locking recesses 19 of the sections of member 10, the plane edge 40 of ring 38 being engaged by a collar 41 threaded as at 42 on the free end of support 5. As will be apparent from Fig. 2, collar 41 serves in cooperation with collar 6 and rings 30, 34 and 38, to clamp the sections of members 9 and 10 in assembled relation on support 5. Collar 41 is preferably provided with peripheral recesses 42' adapted to receive a suitable wrench or other device to facilitate the application and removal of ring 41.

The operation of my improved drum is as follows: Ring 30 is slid onto the support 5 and positioned against collar 6 and the sections of member 9 are successively assembled in annular form on the support with the recesses 18 engaging lip 32 of the ring which thus retains the sections in place. Ring 34 is then slid into position to engage the lips 26 beneath the undercut edge 35 of the ring and the sections of member 10 are then assembled on the support with their lips 27 engaged beneath the undercut edge 36 of the ring 34. The assembly is completed by sliding ring 38 into locking relation with the recesses 19 and the assemblage clamped in position by turning collar 41 tightly against the plane surface 40 of ring 38.

The tire casing may be built on the drum in any desired manner and using conventional tools. Upon completion of the casing collar 41 is removed and the drum with the tire casing thereon slid from the support 5. Rings 30 and 38 are removed, after which the various sections of the members 9 and 10 may be drawn into and removed from the tire annulus, along with ring 34.

Figure 3:
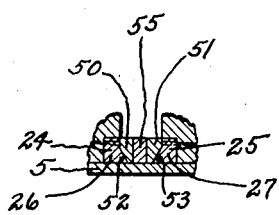
Fig. 3 is a sectional view of a modification showing a multi-piece central locking ring.

In Fig. 3 is shown a modified form of the central locking ring wherein the ring is divided into three members, the outer members 50 and 51 being under cut as at 52 and 53, respectively, for engagement with the flanges 26 and 27 of inserts 24 and 25. The central ring member 55 is rectangular in cross-section and the effective transverse width of the drum may be adjusted by substituting central ring members of various widths, or by inserting a plurality of such members.

It will be understood that the contour of the members 9 and 10 may be varied to meet the requirements of various tire specifications and tire building practice and that I do not limit myself to the exact shape of the interlocking members shown in the drawing.

Having thus described my invention, I claim:

1. A drum and chuck assembly for building pneumatic tire casings of small bead diameter and large cross-section which comprises, a smooth cylindrical support having a diameter slightly less than the bead diameter of the tire to be built, a plurality of members adapted to be radially assembled about the support in annular formation to form the building surface, and means to releasably lock the so assembled members to the support the maximum radial thickness of said members, measured from the face of the support to the crown of the building surface, being no greater than the inside bead diameter of said tire.

2. A drum and chuck assembly for building pneumatic tire casings of small bead diameter and large cross-section which comprises, a cylindrical support, a plurality of transverse drum sections, each section being circumferentially cut into a plurality of parts, and means cooperating with said cylindrical support to releasably lock both the sections and their parts in assembled drum formation.

3. A drum and chuck assembly for building pneumatic tire casings of small bead diameter and large cross-section which comprises, a cylindrical support, a plurality of transverse drum sections, each section being circumferentially divided into two parts, said parts adapted, when assembled, to form an annular drum, locking rings engageable with the outer edges of the sections to maintain said edges in annular formation and a ring cooperating with the support to maintain the inner edges of the parts in annular formation but permitting inward movement of the inner edges in the absence of the support.

4. A drum and chuck assembly for building pneumatic tire casings of small bead diameter and large cross-section which comprises, a cylindrical support, a plurality of arcuate drum sections adapted to be assembled in annular formation on said support, each arcuate section being circumferentially divided into a plurality of parts, the outer edges of the parts being provided with grooves and the inner edges of the parts being provided with flanges, a locking ring having flanges engageable in each of said grooves, a locking ring having under cut edges engageable over each of said inner edge flanges, and means to releasably clamp said rings and parts in assembled relation on the support.

5. A drum and chuck assembly for building pneumatic tire casings of small bead diameter and large cross-section which comprises, a cylindrical support, a plurality of arcuate drum sections adapted to be assembled in annular formation on said support and shaped to form a drum having bead engaging portions adjacent its edges and an elevated central crown portion, each arcuate section being centrally divided into two parts along a plane perpendicular to the axis of the drum, the outer edges of the parts being provided with grooves positioned radially inward from the bead engaging portions and the inner edges of the parts being provided with flanges, end rings slidable on the support and having flanges engageable in said grooves, a center ring slidable on the support and having its edges undercut to overlie the inner edge flanges of the parts, and means to releasably clamp said rings and parts in assembled relation on the support.

6. A drum and chuck assembly for building pneumatic tire casings of small bead diameter and large cross-section which comprises, a cylindrical support provided with a shoulder at one end and threaded at the other, a plurality of arcuate drum sections adapted to be assembled in annular formation on said support and shaped to form a drum having bead engaging portions at adjacent edges and an elevated central crown portion, each arcuate section being centrally divided into two parts along a plane perpendicular to the axis of the drum, the outer edges of the parts being provided with grooves positioned radially inward from the bead engaging portions and the inner edges of the parts being provided with flanges, end rings slidable on the support and having flanges engageable in said grooves, a center ring slidable on the support and having its edges under cut to overlie the inner edge flanges of the parts, and a threaded collar adapted to be turned onto the threaded end of the support and to cooperate with the said shoulder to releasably clamp said rings and parts in assembled relation on the support.

7. An annular drum for building pneumatic tire casings of small bead diameter and large cross-section comprising, a plurality of transverse sections, each section being circumferentially cut into a plurality of parts and clamping means acting against the ends of the sections to releasably hold both said sections and their parts in assembled drum formation.

8. An annular drum for building pneumatic tire casings of small bead diameter and large cross-section, which comprises a smooth cylindrical support, a plurality of transverse drum sections adapted when assembled to form an annular drum, locking rings interengaging the outer edges of the sections to prevent outward radial movement thereof and to maintain the sections in annular formation about the support but permitting inward movement of said edges in the absence of the support.

CHARLES H. DESAUTELS.